Patented Apr. 23, 1940

2,197,860

UNITED STATES PATENT OFFICE 2,197,860

PHTHALOCYANINE DYESTUFFS

Sebastian Gassner and Berthold Bienert, Leverkusen-I. G. Werk, Germany, assignors to General Aniline & Film Corporation, a corporation of Delaware No Drawing. Application November 26, 1937, Serial No. 176,630. In Germany December 22, 1936

4 Claims. (Cl. 260—304)

The present invention relates to new pigments of the phthalocyanine series.

Phthalocyanines represent a new class of pigment dyestuffs which can be prepared in various ways, for instance, by heating an ortho-dihalogen-benzene or an ortho-halogennitrile of the benzene series with cuprous cyanide, by heating ortho-dinitriles of the benzene series with copper or copper salts or by heating aromatic ortho-dicarboxylic acids with a copper salt in the presence of urea. The compounds which are obtainable according to the said processes are characterized by their containing copper in chemical combination. In a similar manner phthalocyanines containing other polyvalent metals than copper can be prepared. Also metalfree phthalocyanines have been prepared either by removing from the phthalocyanines those metals which are relatively loosely bound, such as magnesium, or by heating ortho-dinitriles of the benzene series with an alkali metal alcoholate followed by a hydrolysis of the alkali metal compound thus formed. Phthalocyanines which are derived from ortho-dihalogenbenzenes, ortho-halogennitriles of the benzene series or ortho-dinitriles of the benzene series are for brevity's sake in the following designated as "phthalocyanines of the benzene series."

Most of the hitherto known phthalocyanines show clear blue shades and part of them are characterized by their excellent fastness properties. As far as within the phthalocyanine series products of green coloration have been obtained, they are relatively dull in shades or show insufficient fastness properties.

It is the object of the present invention to prepare phthalocyanines which combine the fastness properties of, for instance, a copper phthalocyanine of the benzene series with such a greenish to yellowish green shade as up to the present could never be achieved within the phthalocyanine series. Other objects of the present invention will be apparent from the following description and claims:

We have found that the presence of oxazol, thiazol or imidazol groups attached to the benzene nuclei turns the shades of the pigments from blue to green or even yellowish-green. In accordance therewith our invention is concerned with phthalocyanines of the benzene series containing oxazol, thiazol or imidazol groups attached to the benzene nuclei. In consideration of their clear green shades and in view of their excellent fastness properties our new products represent valuable pigment dyestuffs and can be employed, for instance, for graphic wall-paper printing and for coloring artificial silk. All compounds of the character described are within the scope of this invention, regardless as to whether they have been prepared by a process starting from ortho-dihalogenbenzenes, from ortho-dinitriles or from ortho-dicarboxylic acids of the benzene series wherein the benzene nuclei contain such substituents or whether these compounds have been prepared in any other way. As to the various methods of preparing phthalocyanines from ortho-dinitriles or other starting materials reference is made to what is stated above with respect to the prior art. We, therefore, confine ourselves to state that copper salts or free copper are preferred reagents for preparing phthalocyanines and that the reaction may be performed in the presence of solid diluents such as sodium sulfate or of liquid diluents such as pyridine, quinoline, benzophenone, nitrobenzene or ortho-dichlorobenzene. Besides the copper complexes there have proved to be particularly valuable the cobalt, nickel and iron complexes and the metalfree compounds. We wish it to be understood that our new compounds may contain various substituents without departing from the principle of our invention. Examples for suitable substituents are alkyl groups or halogen atoms. The latter can be introduced into the molecule either by starting from such products as still contain such substituents or by subjecting the ready made phthalocyanines to an after-halogenation. In the same manner there can be introduced sulfonic acid groups which impart to the product a certain solubility in water and in some cases some affinity towards cellulosic materials such as cotton and viscose or copper silk. These sulfonic acids can be converted into new pigment dyestuffs by treating the same with salts of polyvalent metals or with lake forming amines.

It is to be understood that already the introduction of a single thiazolyl, oxazolyl or imidazolyl group effects a remarkable change of shades towards green, it being our intention not to restrict our invention to those situations wherein a substituent of the character described is attached to each one of the four benzene nuclei of the phthalocyanine. Such asymmetric products can be prepared by starting from a mixture of products wherein one part contains such substituents whereas the other part is free therefrom.

Prior to use our new phthalocyanines are preferably pasted by dissolving the same in cold sulfuric acid or monohydrate with subsequent precipitation in water; in order to effect a finer degree of distribution and in order to diminish the hardness of grain the products can be furthermore subjected to an aftertreatment with dispersing agents in the presence of water.

The following examples illustrate the invention without, however, restricting it thereto the parts being by weight:

Example 1

This example is concerned with the manufacture of the 4'.4''.4'''.4''''-tetra-[C-(6+-methyl-benzthiazolyl)] copper phthalocyanine which is obtained from 3'.4'-dicyanophenyl-(C)-6-methylbenzthiazole according to the following scheme:

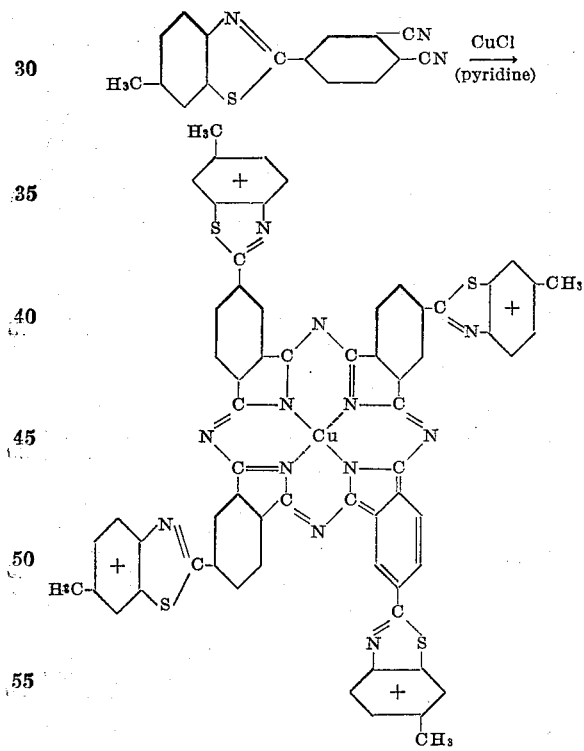

A mixture consisting of

| | Parts |
|---|---|
| Nitrobenzene | 57.5 |
| 3'.4'-dicyanophenyl-(C)-6-methylbenzthiazole | 8 |
| Cuprous chloride | 4.35 |
| Pure pyridine | 1.15 | is heated for 4–5 hours while stirring to 180–190° C. The dyestuff thus obtained is filtered with suction and rinsed with pyridine. It can furthermore be purified by boiling it with dilute hydrochloric acid and dilute caustic soda lye. The 4'.4''.4'''.4''''-tetra-[C-(6+-methylbenzthiazolyl)]-copper phthalocyanine is thus obtained in a good yield. It is soluble in sulfuric acid monohydrate with a brownish-yellow coloration and separates in clear yellowish-green flakes on pouring into water. By treating it with dispersing or wetting agents it can be transformed into a finely divided state. The dyestuff thus obtained is a clear yellowish-green pigment dyestuff of excellent fastness properties.

The same dyestuff is obtained when using benzophenone or trichlorobenzene instead of nitrobenzene as solvent.

A bromo derivative of this copper containing complex compound can be obtained by dissolving the same in an indifferent solvent such as trichlorobenzene and adding thereto bromine which is likewise dissolved in trichlorobenzene. Thereby four bromine atoms can be caused to enter the product. This brominated product shows a somewhat more yellowish shade than the non-brominated dyestuff.

Furthermore, the copper containing dyestuffs obtained as described above can be sulfonated by the action of a 20% oleum. Depending on the time and on the temperature of reaction the resulting sulfonation products are more or less soluble in water. In case the sulfonation is effected at a higher temperature, the resulting products show a certain affinity towards cellulosic material such as viscose silk. The sulfonic acids thus obtained, if transformed into their color lakes, for instance into the calcium or barium lakes, likewise represent valuable pigment dyestuffs.

The process described in the beginning of this example can be modified by replacing part of the 3'.4'-dicyanphenyl-(C)-6-methylbenzthiazole by the stoichiometric amount of phthalonitrile, preferably while working in the absence of liquid diluents. In this manner asymmetric phthalocyanines, i. e. products which contain less than four thiazol groups, are obtained.

Example 2

This example is concerned with the manufacture of the metalfree 4'.4''.4'''.4''''-tetra-[C-(6+-methylbenzthiazolyl)]-phthalocyanine:

5.5 parts of 3'.4'-dicyanphenyl-(C)-6-methylbenzthiazole are introduced while stirring and while heating to 80–85° C. into a solution of 0.25 part of sodium in 8.15 parts of amyl alcohol. After the further addition of 53.2 parts of ortho-dichlorobenzene the mixture is gradually heated while stirring to boiling (156° C.) the dyestuff being thereby separated. After about 1 hour the dyestuff is filtered with suction and rinsed with ortho-dichlorobenzene and alcohol. On dissolving the crude reaction product in sulfuric acid monohydrate, which gives a solution with a brownish-yellow coloration, and precipitation in water the metal free 4'.4''.4'''.4''''-tetra-[C-(6+-methylbenzthiazolyl)]-phthalocyanine is obtained which is somewhat more yellowish than the copper compound.

Example 3

This example is concerned with the manufacture of the 4'.4''.4'''.4''''-tetra[C-(6+-methylbenzthiazolyl)]-nickel phthalocyanine:

A mixture consisting of

| | Parts |
|---|---|
| Quinoline | 28 |
| 3'.4'.dicyanophenyl-(C)-6-methylbenzthiazole | 5.5 |
| Anhydrous nickel chloride | 2.75 | is heated for 1 hour to 175–180° C. The nickel complex thus formed is filtered with suction, diluted with pyridine and thoroughly rinsed with pyridine and hot water. The properties of the new dyestuff thus obtained are similar to those of the copper compound.

*Example 4*

This example is concerned with the manufacture of the 4'.4''.4'''.4''''-tetra-[C-(benzoxazolyl)]-copper-phthalocyanine:

A mixture consisting of

| | Parts |
|---|---|
| Quinoline | 15 |
| 3'.4'-dibromophenyl-(C)-benzoxazole (which is obtained from 3.4-dibromobenzoyl chloride and o-aminophenol) | 5.1 |
| Cuprous cyanide | 2.7 |
| Cuprous bromide | 5 | is heated for 1 hour while stirring to 220–230° C. After diluting the reaction mixture with 15 parts of pyridine the dyestuff is filtered with suction, rinsed with pyridine and then boiled with dilute hydrochloric acid.

The 4'.4''.4'''.4''''-tetra-[C-(benzoxazolyl)]-copper phthalocyanine is soluble in sulfuric acid monohydrate with a yellowish-brown coloration and separates in clear yellowish-green flakes on pouring into water.

*Example 5*

The 4'.4''.4'''.4''''-tetra-[C-(benzimidazolyl)]-copper phthalocyanine can be obtained in a similar manner to that described in Example 4 by starting from 3'.4'-dibromophenyl-(C)-benzimidazole which can be produced by the condensation of 3.4-dibromobenzoyl chloride with o-phenylendiamine.

We claim:

1. A phthalocyanine of the general formula:

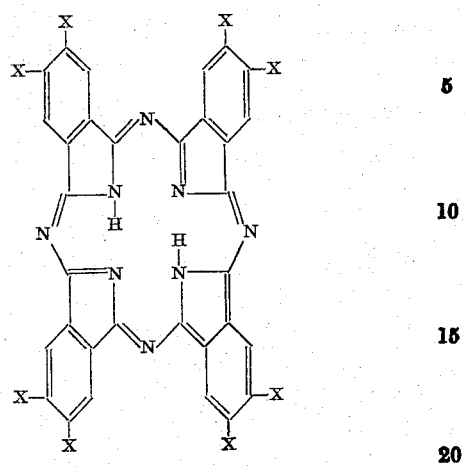

wherein the two hydrogen atoms may be replaced by one metal atom selected from the group consisting of copper, nickel, cobalt and iron, and wherein one of the X's in at least one of the benzene nuclei stands for a C-benzthiazolyl radical, and the other for hydrogen.

2. A copper phthalocyanine as claimed in claim 1 wherein one of the X's in each of the benzene nuclei stands for a C-benzthiazolyl radical.

3. A halogenated copper phthalocyanine as claimed in claim 1 wherein one of the X's in each of the benzene nuclei stands for a C-benzthiazolyl radical.

4. A sulfonated copper phthalocyanine as claimed in claim 1 wherein one of the X's in each of the benzene nuclei stands for a C-benzthiazolyl radical.

SEBASTIAN GASSNER.
BERTHOLD BIENERT.